(12) United States Patent
Jou

(10) Patent No.: US 11,422,087 B2
(45) Date of Patent: Aug. 23, 2022

(54) DEVICE AND METHOD FOR MEASURING RETINA SAFETY IMPROVEMENT INDEX

(71) Applicant: National Tsing Hua University, Hsinchu (TW)

(72) Inventor: Jwo-Huei Jou, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 155 days.

(21) Appl. No.: 16/743,006

(22) Filed: Jan. 15, 2020

(65) Prior Publication Data

US 2021/0172865 A1 Jun. 10, 2021

(30) Foreign Application Priority Data

Dec. 4, 2019 (TW) ................................. 108144236

(51) Int. Cl.
| | |
|---|---|
| *G01N 21/31* | (2006.01) |
| *G01N 21/25* | (2006.01) |
| *G02B 5/20* | (2006.01) |
| *G02C 7/10* | (2006.01) |

(52) U.S. Cl.
CPC .......... *G01N 21/31* (2013.01); *G01N 21/255* (2013.01); *G02B 5/20* (2013.01); *G02C 7/10* (2013.01); *G01N 2201/062* (2013.01)

(58) Field of Classification Search
CPC ................. G01N 21/31; G01N 21/255; G01N 2201/062; G02B 5/20; G02B 5/208; G02C 7/10; G02C 9/00; G02C 7/104; G01J 3/28
See application file for complete search history.

(56) References Cited

U.S. PATENT DOCUMENTS

2019/0368927 A1* 12/2019 Vakhshoori ........... G01J 3/0237

* cited by examiner

*Primary Examiner* — Hwa Andrew Lee
(74) *Attorney, Agent, or Firm* — Anova Law Group, PLLC

(57) ABSTRACT

Disclosures of the present invention describe a device for measuring retina safety improvement index, comprising: a light receiving unit, a first data processing unit and a second data processing unit. The light receiving unit receives a first visible light and a second visible light that is obtained by letting the first visible light pass through a blue light blocking product. The first data processing unit calculates a first maximum permissible exposure (MPE) of the first visible light and a second MPE of the second visible light. The second data processing unit calculates a retina safety improvement (RSI) index based on the first MPE and the second MPE. As such, by using this device, a consumer is facilitated to know how much eyes-protecting ability does a specific blue light blocking product have, without needing to read any numeric value of blue light filtering percentage and/or unfamiliar spectrogram.

2 Claims, 10 Drawing Sheets

DEVICE AND METHOD FOR MEASURING RETINA SAFETY IMPROVEMENT INDEX

BACKGROUND OF THE INVENTION

1. Field of the Invention

The present invention relates to the technology field of eye-protection index calculating, and more particularly to a device and method for measuring retina safety improvement index (RSI).

2. Description of the Prior Art

It is well known that natural light consists of visible and invisible lights, wherein infrared (IR) light and ultraviolet (UV) light are two of the invisible lights. On the other hand, it is understood that the visible lights comprise red, orange, yellow, green, blue, indigo, and purple lights. Retina is an important part of human eyes, and having specific function of converting light signal to neural signal. FIG. 1 illustrates one diagram for showing a sunlight spectrum, and there is another one diagram for showing an emission spectrum of a white light LED provided in FIG. 2. It is known that the specific light irradiated from sun commonly has a continuous spectrum. Differing from the sunlight, however, an LED lighting element that is configured for emitting an artificial light (i.e., white light) has been widely applied in various illumination devices, backlight modules and self-luminous display panels. From FIG. 2, it is found that the white light of the LED lighting element has a discontinuous spectrum that merely contains visible wavelengths in a range from 430 nm to 680 nm. Moreover, FIG. 1 also indicates that intensity of the green light is greater than that of the blue light in the sunlight spectrum. On the contrary, FIG. 2 shows that the artificial light emitted from the white light LED contains a high-intensity blue light.

It is worth further explaining that, blue light contains a visible wavelength in a range between 400 nm and 500 nm, and a proper lighting of blue light can lift a person's spirits and make the person has a feeling of pleasure. However, many different research reports all conclude that, too much illumination of blue light would bring light pollution, disturbance of human biological clock, loss of sleep, and eye damage on. To be more seriously, too much illumination of blue light may cause a man suffer from macular degeneration. As such, because it is well known that people every day have a considerably long elapsed time of using their 3C products (like laptop computer, smart phone or tablet PC) in every day, optometrists, eyewear manufacturing companies and lamp manufacturing companies have made great efforts to propagate the importance of using blue light filtering (blocking) products.

Blue-light blocking eyeglass lens, blue-light blocking (filtering) screen protector and blue light filter application (App) are three of the blue light filtering (blocking) products nowadays. FIG. 3 shows a stereo diagram of an eyeglasses 1' that is installed with two blue-light blocking eyeglass lenses 11'. On the other hand, there are two emission spectrum graphs provided in FIG. 4. It needs to further explain that, emission spectrum (a) in FIG. 4 is measured from an artificial light such as a white light emitted from an LED element, and the emission spectrum (a) exhibits that the artificial light has a visible wavelength portion containing high-intensity blue light. Moreover, after letting the artificial light pass through the any one of the two blue-light blocking eyeglass lens 11', the emission spectrum (b) shows that the intensity of the blue light portion of the artificial light has an abruptly reduce. Usually, sellers of eyewear and blue-light blocking (filtering) screen protector present the blue light blocking ability of one specific blue-light blocking product by using blocking rate (i.e., percentage). On the other hand, to provide the forgoing emission spectrums (a) and (b) is another way for the sellers of eyewear and blue-light blocking (filtering) screen protector to show the blue light blocking ability of the specific blue-light blocking product.

It is a pity that, after reading the numeric value of the blue light filtering percentage and/or studying the unfamiliar spectrogram, a normal consumer (user) commonly still fails to know how much eyes protection ability does a specific blue-light blocking (filtering) product have.

From above descriptions, it is clear that there is a lack of a specific index for exactly showing how much eyes protection ability does a specific blue-light blocking (filtering) product have. In view of that, inventors of the present application have made great efforts to make inventive research and eventually provided a device and method for measuring retina safety improvement index (RSI).

SUMMARY OF THE INVENTION

The primary objective of the present invention is to disclose a device and method for measuring retina safety improvement index (RSI), wherein the device comprises: a light receiving unit, a first data processing unit and a second data processing unit. The light receiving unit is used for receiving a first visible light and a second visible light that is obtained by letting the first visible light pass through a blue-light blocking (filtering) product. On the other hand, the first data processing unit is configured for calculating a first maximum permissible exposure (MPE) of the first visible light and a second MPE of the second visible light, such that the second data processing unit is able to eventually calculate a retina safety improvement (RSI) index based on the first MPE and the second MPE. As such, by using this novel device, a consumer is facilitated to know how much eyes-protecting ability does a specific blue light blocking (filtering) product have, without needing to read any numeric value of blue light filtering percentage and/or unfamiliar spectrogram.

In order to achieve the primary objective of the present invention, the inventor of the present invention provides an embodiment for the device for measuring retina safety improvement index (RSI), which is applied for measuring a retina safety improvement index (RSI) of a blue light blocking product, and comprising:

a light receiving unit, being used for receiving a first visible light and a second visible light, wherein the second visible light is a light that passes through the blue light blocking product;

a first data processing unit, being configured for calculating a first maximum permissible exposure (MPE) of the first visible light and a second maximum permissible exposure (MPE) of the second visible light; and a second data processing unit, being configured for calculating a retina safety improvement (RSI) index based on the first MPE and the second MPE.

In one embodiment, the forgoing device further comprises:

a main control unit, being coupled to the light receiving unit, the first data processing unit, and the second data processing unit;

a display unit, being coupled to the main control unit, thereby being controlled by the main control unit so as to display the first MPE, the second MPE and/or the RSI index;

an input unit, being coupled to the main control unit, such that a user is facilitated to input at least one parameter and/or at least one operating command to the main control unit through the input unit; and a communication unit, being coupled to the main control unit, such that the main control unit is able to communicate with an external electronic device through the communication unit.

In one embodiment, the forgoing device is a specific electronic device selected from the group consisting of desk spectrometer, portable spectrometer, smartphone integrated with micro-spectrometer sensor, smartphone connected with external spectrometer, tablet PC integrated with micro-spectrometer sensor, tablet PC connected with external spectrometer, laptop computer integrated with micro-spectrometer sensor, laptop computer connected with external spectrometer, all-in-one desktop computer integrated with micro-spectrometer sensor, all-in-one desktop computer connected with external spectrometer, and desktop computer connected with external spectrometer.

In the embodiment of the forgoing device, the blue light blocking product is selected from the group consisting of blue-light blocking eyeglass lens, blue-light blocking protector of display screen, blue-light blocking protector of plane-type illumination device, and blue-light blocking protector of bulb-type illumination device.

In the embodiment of the forgoing device, the main control unit is integrated in a micro controller, and the first data processing unit and the second data processing unit are provided in the microprocessor by a form of firmware, function library, application program, or operands.

In the embodiment of the forgoing device, the display unit is a touch screen display, and the input unit comprises a plurality of key presses.

In the embodiment of the forgoing device, the communication unit comprises a wired transmission interface and/or a wireless transmission interface.

Moreover, the inventor of the present invention also provides an embodiment for the method for stimulating biological fermentation, which is applied for measuring a retina safety improvement index (RSI) of a blue light blocking product, and comprising following steps:

(1) letting a light receiving unit receive a first visible light and a second visible light, wherein the second visible light is a light that passes through the blue light blocking product;

(2) configuring a first data processing unit to calculate a first maximum permissible exposure (MPE) of the first visible light and a second maximum permissible exposure (MPE) of the second visible light; and (3) configuring a second data processing unit to calculate a retina safety improvement (RSI) index based on the first MPE and the second MPE.

In one embodiment, the forgoing method further comprises following step:

(4) letting a display unit display the first MPE, the second MPE, and/or the RSI index.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a device and method for measuring retina safety improvement index (RSI) disclosed by the present invention, embodiments of the present invention will be described in detail with reference to the attached drawings hereinafter.

Figure 1:
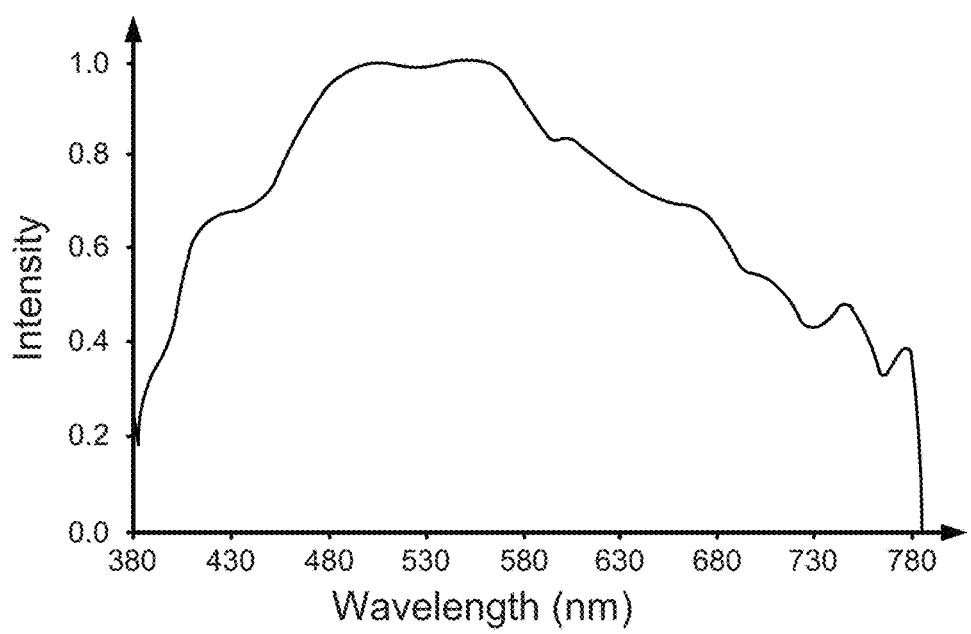
FIG. 1 shows a diagram for showing a sunlight spectrum.
Figure 2:
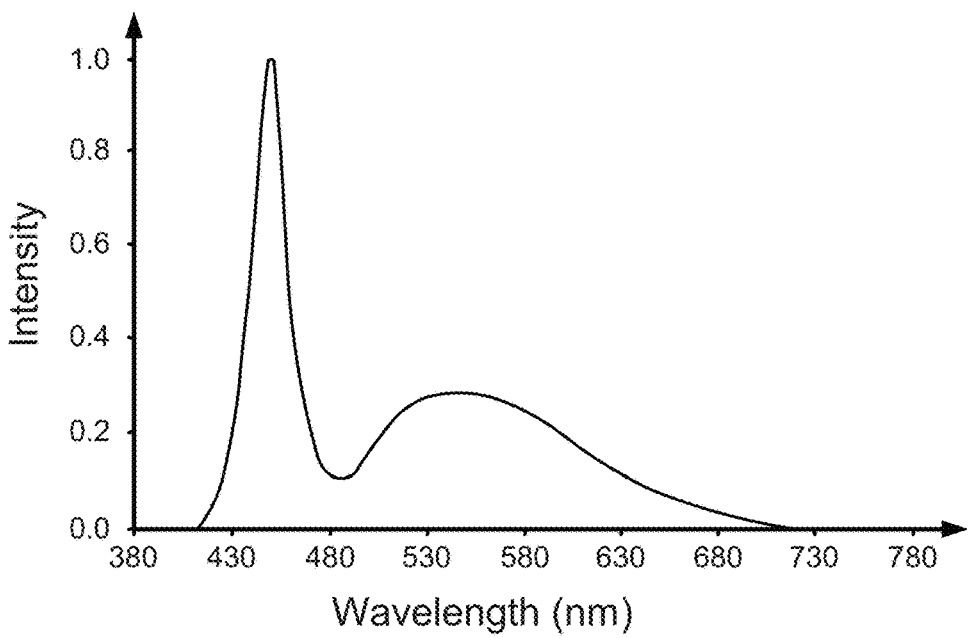
FIG. 2 shows a diagram for showing an emission spectrum of a white light LED.
Figure 3:
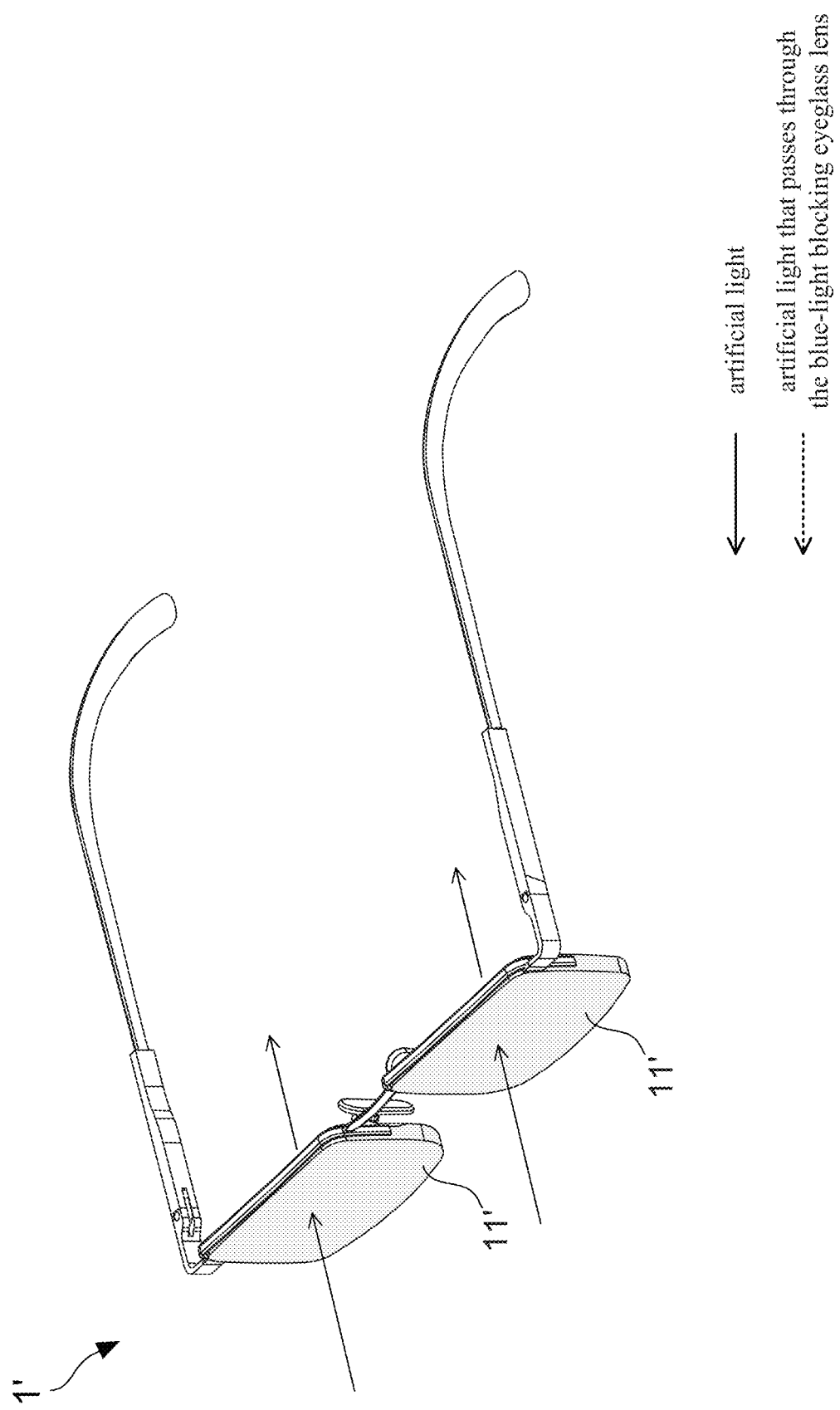
FIG. 3 shows a stereo diagram of an eyeglasses that is installed with two blue-light blocking eyeglass lenses.
Figure 4:
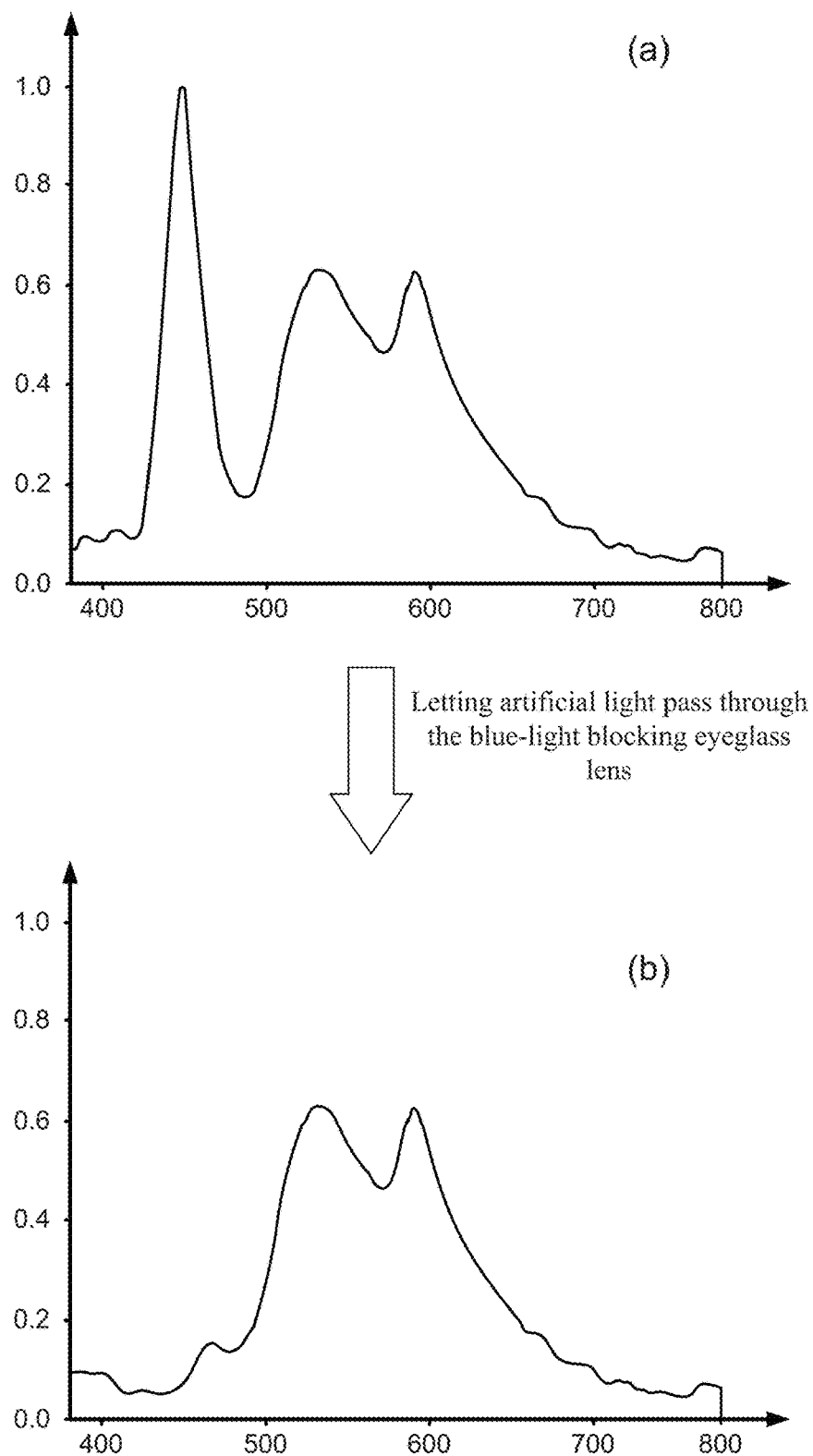
FIG. 4 shows a diagram for showing two emission spectrum graphs.
Figure 5:
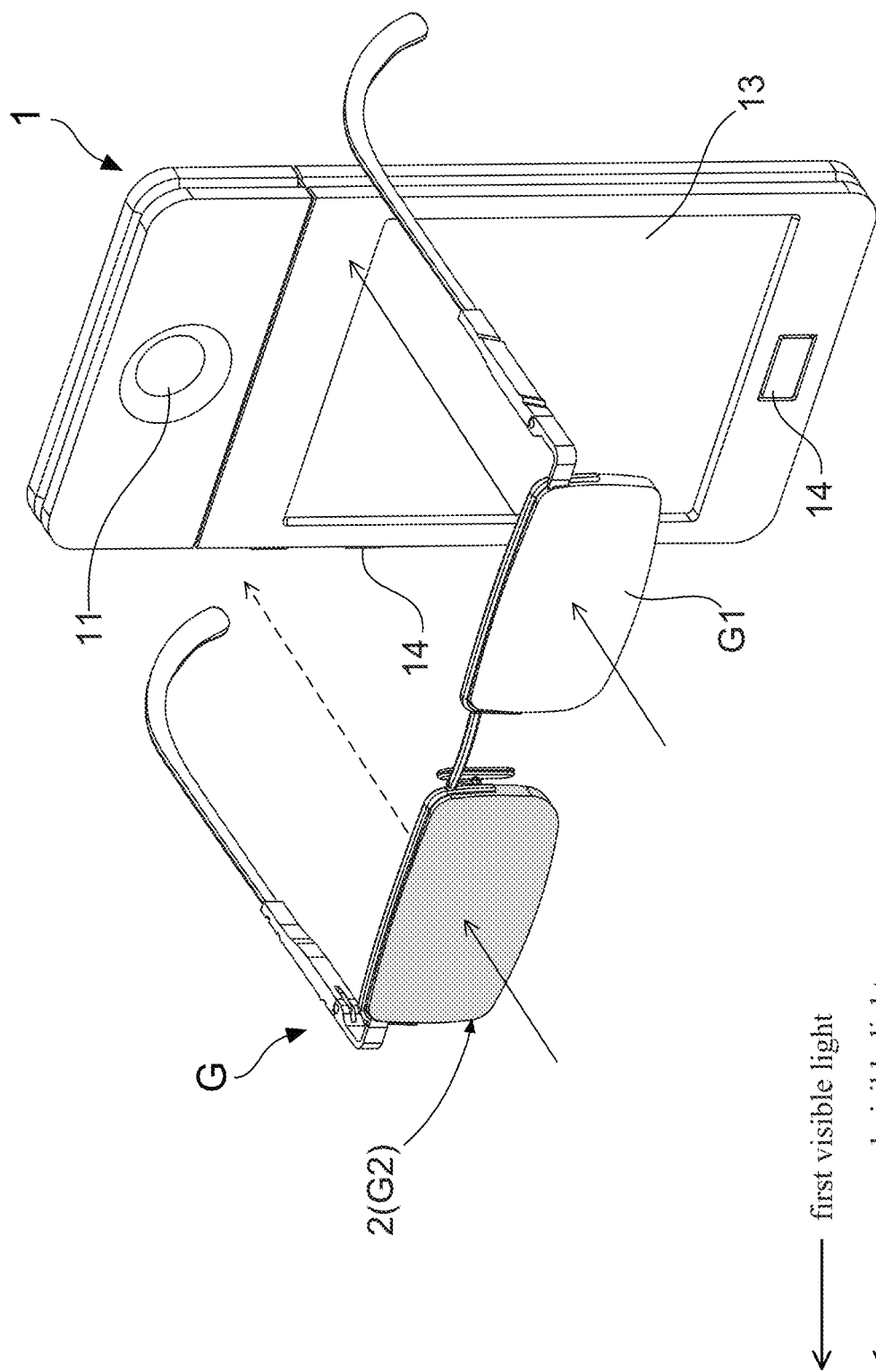
FIG. 5 shows a first stereo diagram of a device for measuring retina safety improvement index (RSI) according to the present invention.
Figure 6:
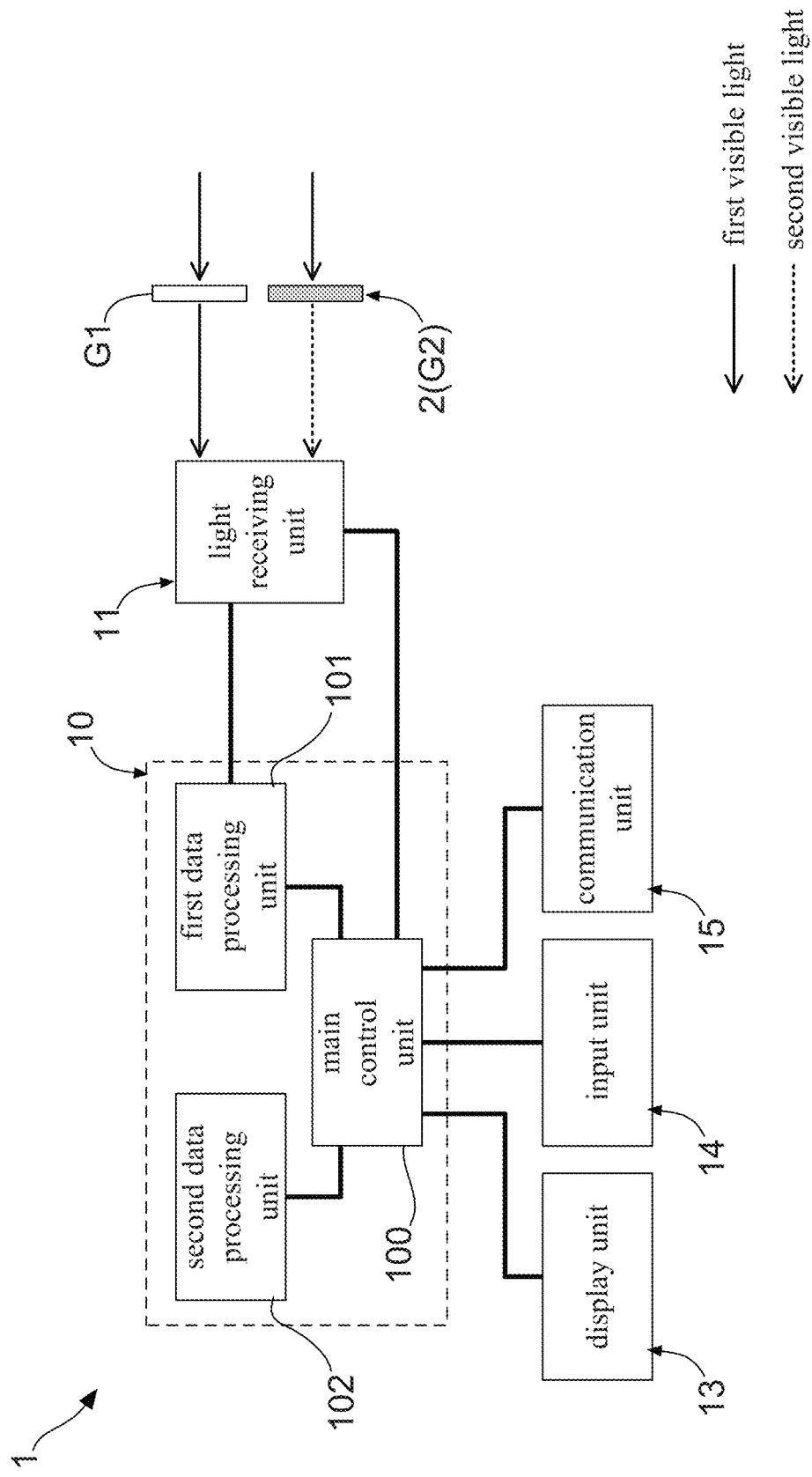
FIG. 6 shows a block diagram of the device for measuring retina safety improvement index (RSI) according to the present invention.

With reference to FIG. 5, there is shown a first stereo diagram of a device for measuring retina safety improvement index (RSI) according to the present invention. Moreover, FIG. 6 illustrates a block diagram of the device for measuring retina safety improvement index (RSI) according to the present invention. In FIG. 5, one eyeglasses G is presented, and the eyeglasses G is equipped with a first eyeglass lens G1 and a second eyeglass lens G2 that has function of blue light blocking (filtering). Briefly speaking, a blue light blocking (filtering) product 2 is applied in the eyeglasses G by a form of the second eyeglass lens G2. Particularly, the device 1 of the present invention is configured for measuring retina safety improvement index (RSI) from one blue light blocking (filtering) product 2. From FIG. 5 and FIG. 6, it is easily understood that, the device 1 mainly comprises: a light receiving unit 11, a microprocessor 10, a display unit 13, an input unit 14, and a communication unit 15.

The microprocessor 10 comprises a main control unit 100, a first data processing unit 101 coupled to the main control unit 100, and a second data processing unit 102 coupled to the main control unit 100. In a normal operation of the device 1, the light receiving unit 11 is used for receiving a first visible light and a second visible light, wherein the second visible light is a light that passes through the blue light blocking product 2. Moreover, the first data processing unit 101 is configured for calculating a first maximum permissible exposure (MPE) of the first visible light and a second maximum permissible exposure (MPE) of the second visible light.

As described in more detail below, the second data processing unit 102 is configured for calculating a retina safety improvement (RSI) index based on the first MPE and the second MPE. Herein, it needs to explain that, how to calculate a specific light source's MPE has been disclosed in American National Standards Institute (ANSI) Z136.1-1. On the other hand, although FIG. 5 depicts that the blue light blocking (filtering) product 2 is presented by a form of the second eyeglass lens G2, but the eyeglass lens is not a limit form of the blue light blocking (filtering) product 2. In one practicable embodiment, the blue light blocking (filtering) product 2 can also be a blue-light blocking protector of display screen, a blue-light blocking protector of plane-type illumination device, or a blue-light blocking protector of bulb-type illumination device.

Therefore, in one embodiment, the first data processing unit 101 can be configured for calculating the first MPE and the second MPE by using the MPE calculation formula that is disclosed by ANSI Z136.1-1. However, for effectively saving computing time as well as preventing the computing resources of the microprocessor 10 from being occupied exceedingly, the present invention provides following two mathematical equations for facilitating the first data processing unit 101 calculate the first MPE and the second MPE rapidly and effectively.

$$E_B = \sum_{300}^{700} E_\lambda \cdot B(\lambda); \quad (1)$$

$$MPE = \frac{100}{E_B}. \quad (2)$$

In the forgoing mathematical equations (1) and (2), $E_B$ is an index of blue light hazard, $B(\lambda)$ is a function of blue light hazard, and $E_\lambda$ is irradiance of the light under test. It is worth noting that, unit of the maximum permissible exposure (MPE) that is calculated by using the forgoing mathematical equations (1) and (2) is second. Consequently, after the first MPE and the second MPE are obtained, the second data processing unit 102 is able to further calculate a retina safety improvement (RSI) index based on the first MPE and the second MPE. Particularly, the present invention provides following mathematical equation for facilitating the second data processing unit 102 calculate the RSI index rapidly and effectively.

$$RSI = \frac{MPE}{MPE'}. \quad (3)$$

In the forgoing mathematical equation (3), RSI is the index for describing a retina safety improvement of a specific blue light blocking product 2. From the mathematical equation (3), it should be understood that, the RSI index is a ratio of the second MPE and the first MPE. In addition, FIG. 6 also depicts that the device 1 of the present invention also comprises a display unit 13, an input unit 14 and a communication unit 15. The display unit 13 is coupled to the main control unit 100, thereby being controlled by the main control unit 100 so as to display the first MPE, the second MPE and/or the RSI index. On the other hand, the input unit 14 is coupled to the main control unit 100, such that a user is facilitated to input at least one parameter and/or at least one operating command to the main control unit 100 through the input unit 14. The communication unit 15 is also coupled to the main control unit 100, such that the main control unit 100 is able to communicate with an external electronic device through the communication unit 15.

Herein, it needs further explain that, FIG. 5 depicts that the device 1 of the present invention is a portable spectrometer having a microprocessor 10 that comprises a main control unit 100, a first data processing unit 101 and a second data processing unit 102. In which, the first data processing unit 101 and the second data processing unit 102 are provided in the microprocessor 10 by a form of firmware, function library, application program, or operands. However, besides the portable spectrometer, the device 1 of the present invention can also be presented by a form of an electronic device that is selected from the group consisting of desk spectrometer, smartphone integrated with micro-spectrometer sensor, smartphone connected with external spectrometer, tablet PC integrated with micro-spectrometer sensor, tablet PC connected with external spectrometer, laptop computer integrated with micro-spectrometer sensor, laptop computer connected with external spectrometer, all-in-one desktop computer integrated with micro-spectrometer sensor, all-in-one desktop computer connected with external spectrometer, and desktop computer connected with external spectrometer.

Figure 7:
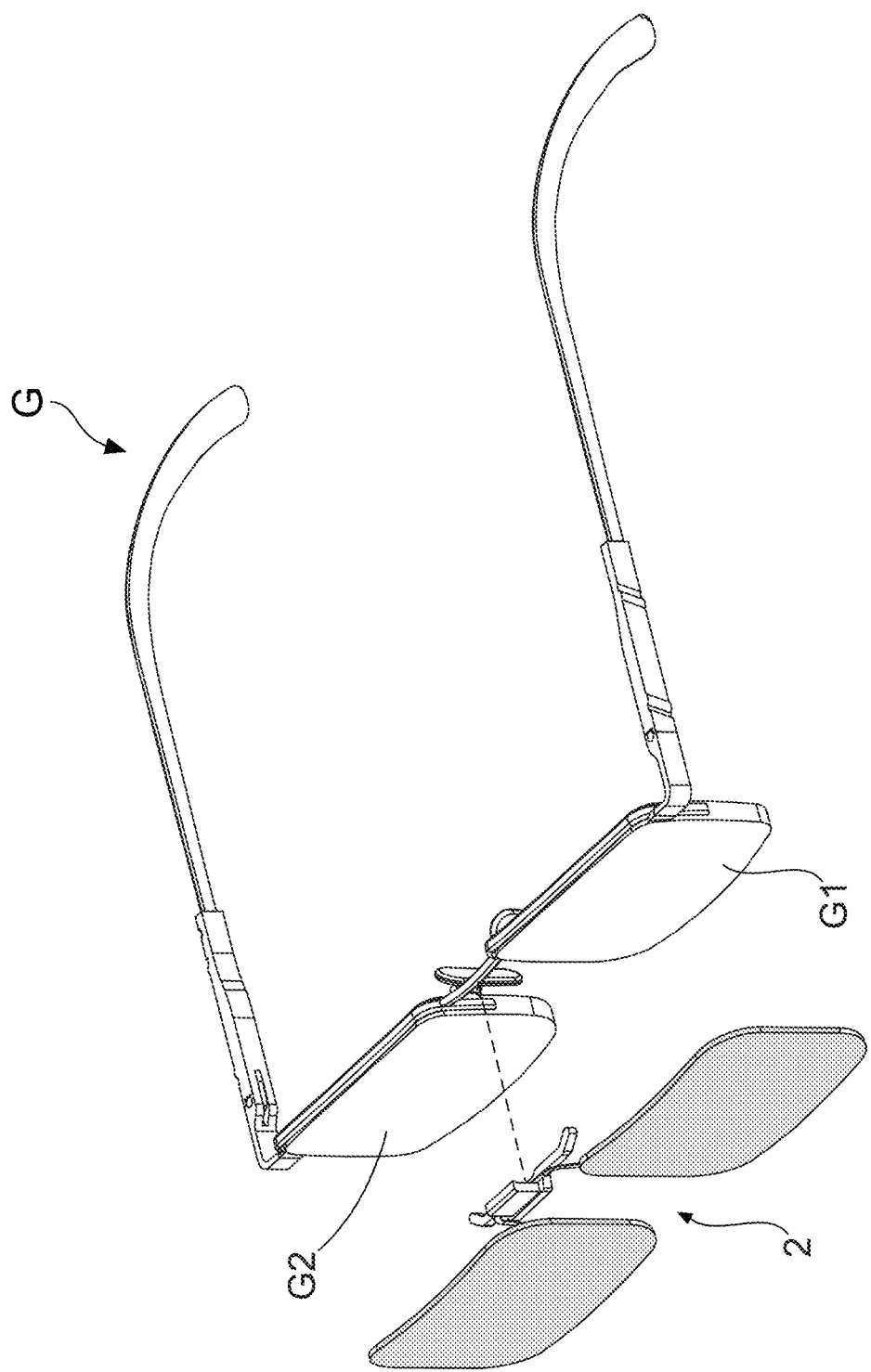
FIG. 7 shows a stereo diagram for depicting a unit of clip-on eyeglass lenses and an eyeglasses.
Figure 8:
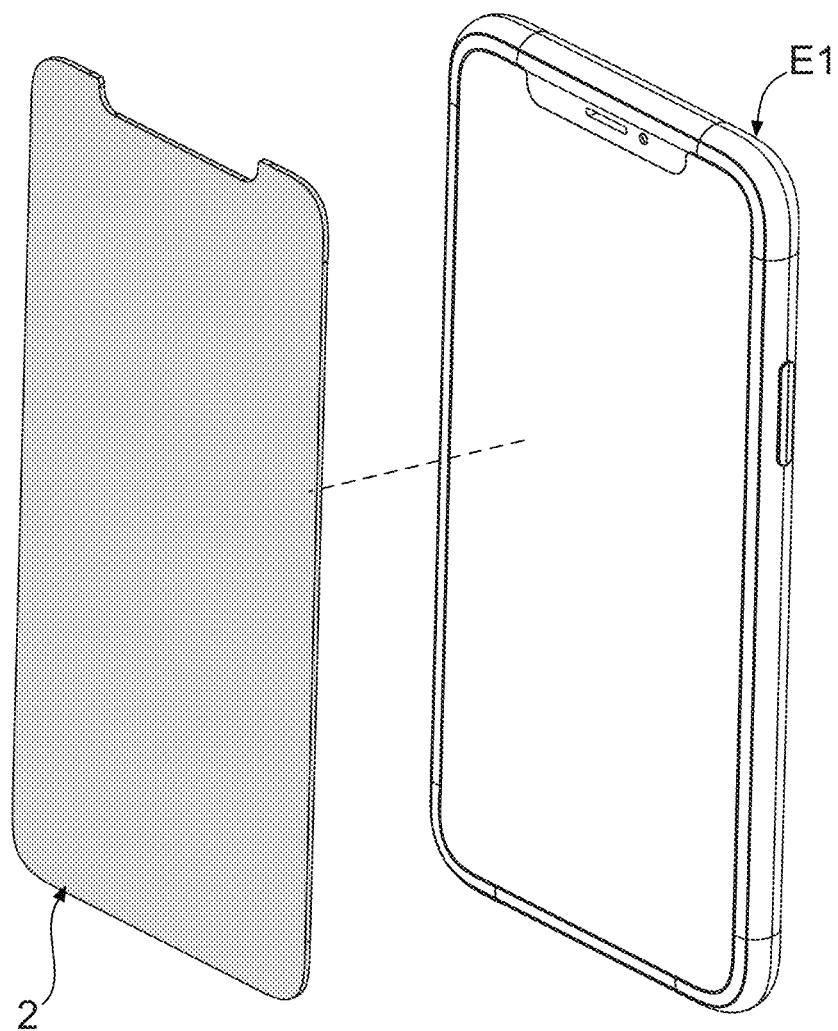
FIG. 8 shows a stereo diagram for depicting a blue light blocking protector of display screen and a smartphone.
Figure 9:
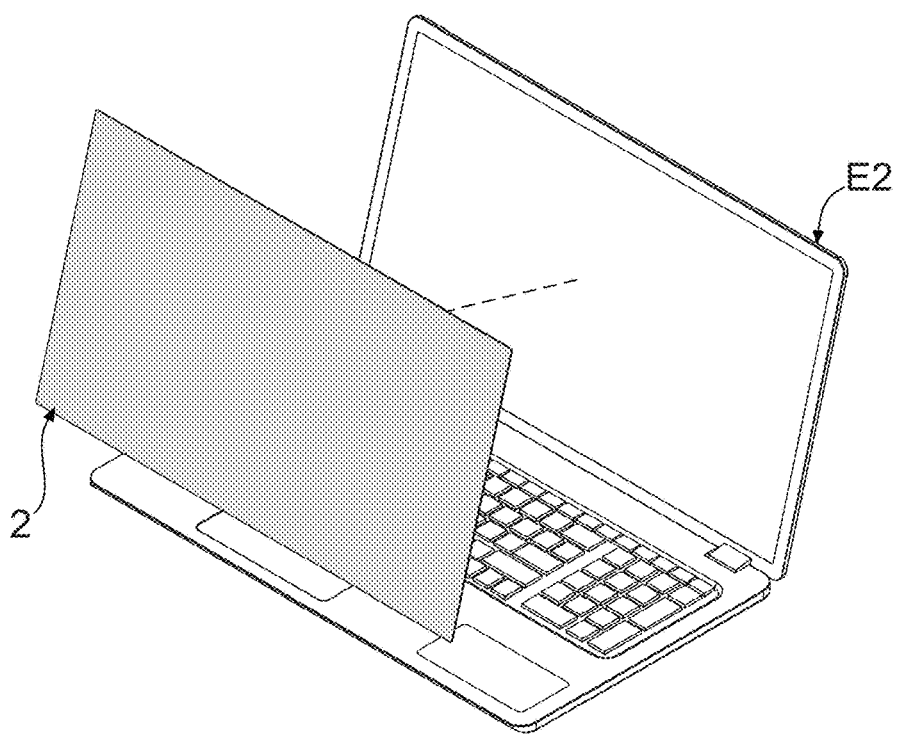
FIG. 9 shows a stereo diagram for depicting a blue light blocking protector of display screen and a laptop computer.
Figure 10:
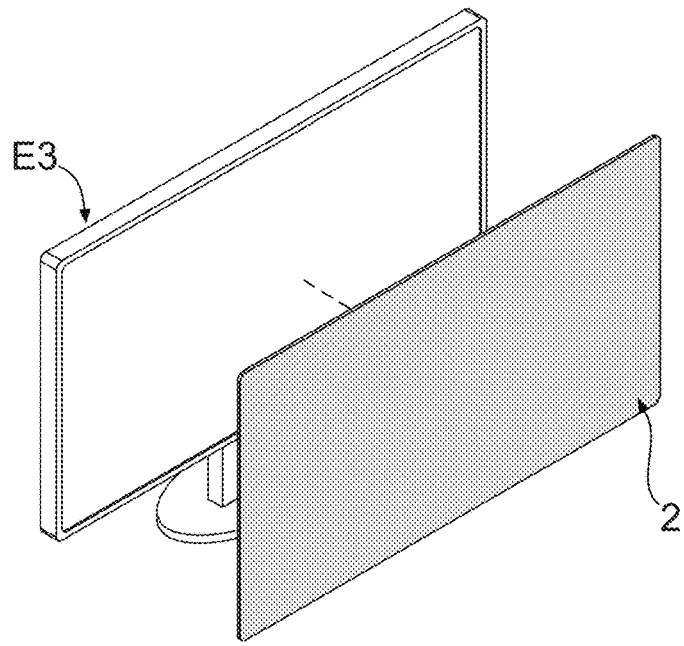
FIG. 10 shows a stereo diagram for depicting a blue light blocking protector of display screen and a display device.

It should be understood that, the display unit 13 shown in FIG. 5 can be a display device or a touch screen display device. In addition, the input unit 14 comprising a plurality of key presses, and the communication unit 15 comprises a wired transmission interface and/or a wireless transmission interface. On the other hand, FIG. 7 shows a stereo diagram for depicting a unit of clip-on eyeglass lenses and an eyeglasses. Although FIG. 5 shows that the blue light blocking (filtering) product 2 is applied in the eyeglasses G by a form of the second eyeglass lens G2, FIG. 7 depicts that the blue light blocking product can also be presented by a form of a unit of clip-on eyeglass lenses. Moreover, FIG. 8 shows a stereo diagram for depicting a blue light blocking protector of display screen and a smartphone, FIG. 9 shows a stereo diagram for depicting a blue light blocking protector of display screen and a laptop computer, and FIG. 10 shows a stereo diagram for depicting a blue light blocking protector of display screen and a display device. From FIG. 8, FIG. 9, and FIG. 10, it should be understood that, the light blocking product 2 can also be a blue-light blocking protector for attaching onto a display screen of a smartphone E1, a blue-light blocking protector for attaching onto a display screen of a laptop computer E2, or a blue-light blocking protector for attaching onto a display screen of a display device E3. Otherwise, the blue light blocking product 2 can also be presented by a form of a blue-light blocking protector of plane-type illumination device or a blue-light blocking protector of bulb-type illumination device.

Experiment

Figure 11:
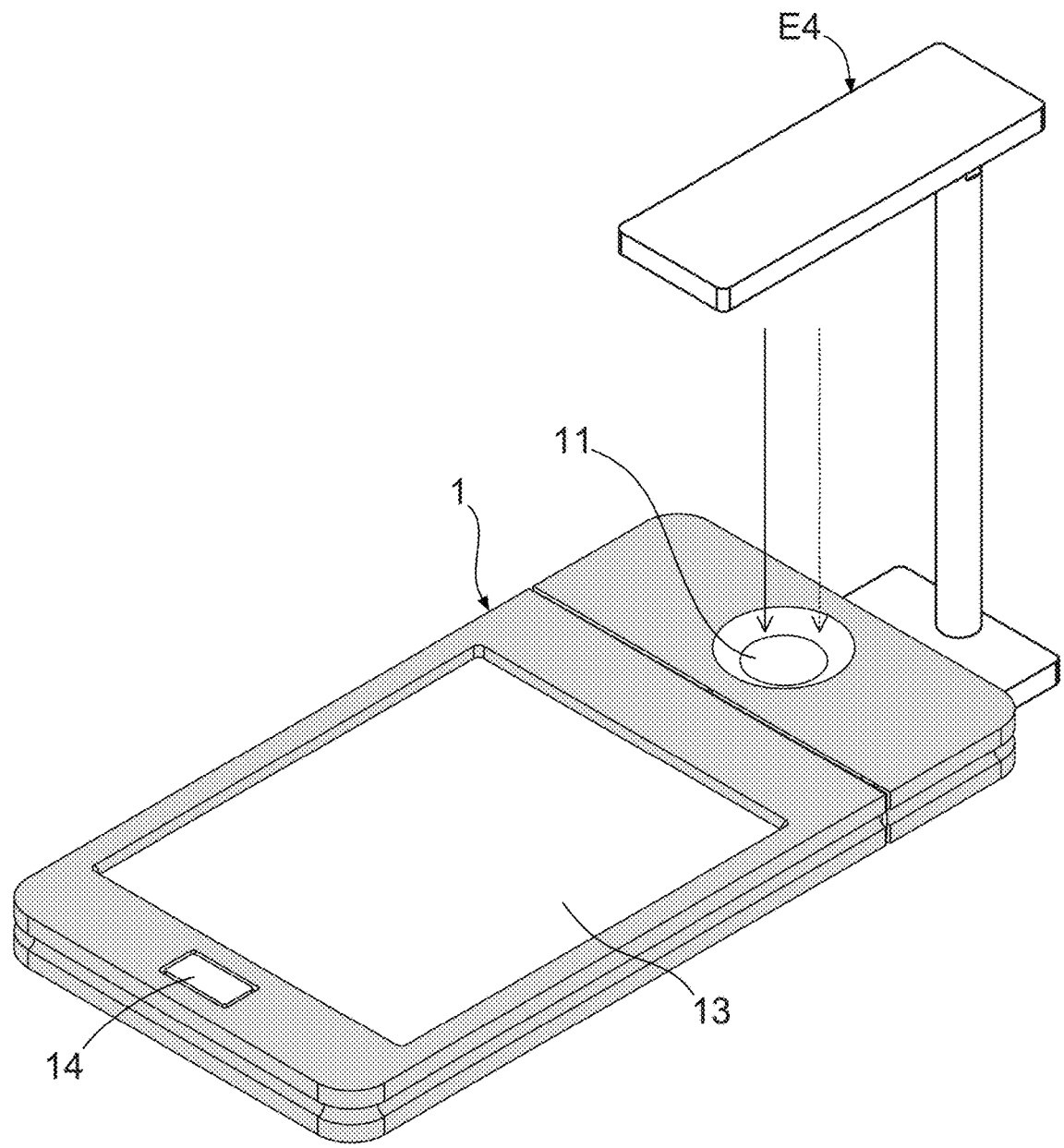
FIG. 11 shows a second stereo diagram of the device for measuring retina safety improvement index (RSI) according to the present invention.

FIG. 11 shows a second stereo diagram of the device for measuring retina safety improvement index (RSI) according to the present invention. When executing a first experiment, an LED desk lamp E4 is prepared, and the device 1 of the present invention is adopted for measuring a first MPE of a first visible light (i.e. white light) radiated from the LED desk lamp E4. After that, a blue-light blocking (filtering) protector made by A company is attached onto a light emission plane of the LED desk lamp E4, so as to subsequently use the device 1 of the present invention to measure a second MPE of a second visible light (i.e. a light obtained by letting the white light pass through the blue-light blocking protector) radiated from the LED desk lamp E4. In a normalized situation, the device 1 calculates the first MPE and the second MPE to 100 seconds and 468 seconds respectively, such that the device 1 of the present invention consequently calculates the RSI index of the LED desk lamp E4 to 4.68.

During the execution of a second experiment, the identical LED desk lamp E4 is also prepared, and the device 1 of the present invention is adopted for measuring a first MPE of a first visible light (i.e. white light) radiated from the LED desk lamp E4. After that, a blue-light blocking (filtering) protector made by B company is attached onto a light emission plane of the LED desk lamp E4, so as to subsequently use the device 1 of the present invention to measure a second MPE of a second visible light (i.e. a light obtained by letting the white light pass through the blue-light blocking protector) radiated from the LED desk lamp E4. In a normalized situation, the device 1 calculates the first MPE and the second MPE to 100 seconds and 870 seconds respectively, such that the device 1 of the present invention consequently calculates the RSI index of the LED desk lamp E4 to 8.7.

From above descriptions, it is understood that, by using this novel device 1, a consumer is facilitated to know how much eyes-protecting ability does a specific blue light blocking (filtering) product have, without needing to read any numeric value of blue light filtering percentage and/or unfamiliar spectrogram. For example, in the case of an eye protection effect of the LED desk lamp E4 is set to 1, the eye protection effect of the LED desk lamp E4 that is equipped with the blue-light blocking (filtering) protector made by A company is increased to 4.68, and the eye protection effect of the LED desk lamp E4 that is equipped with the blue-light blocking (filtering) protector made by B company largely grows to 8.7. As described in more detail below, in the case of the LED desk lamp E4 has a recommended use time of 1 hour, the recommended use time of the LED desk lamp E4 can be prolonged to 4.68 (8.7) hours after being equipped with the blue-light blocking (filtering) protector made by A company (B company).

Figure 12:
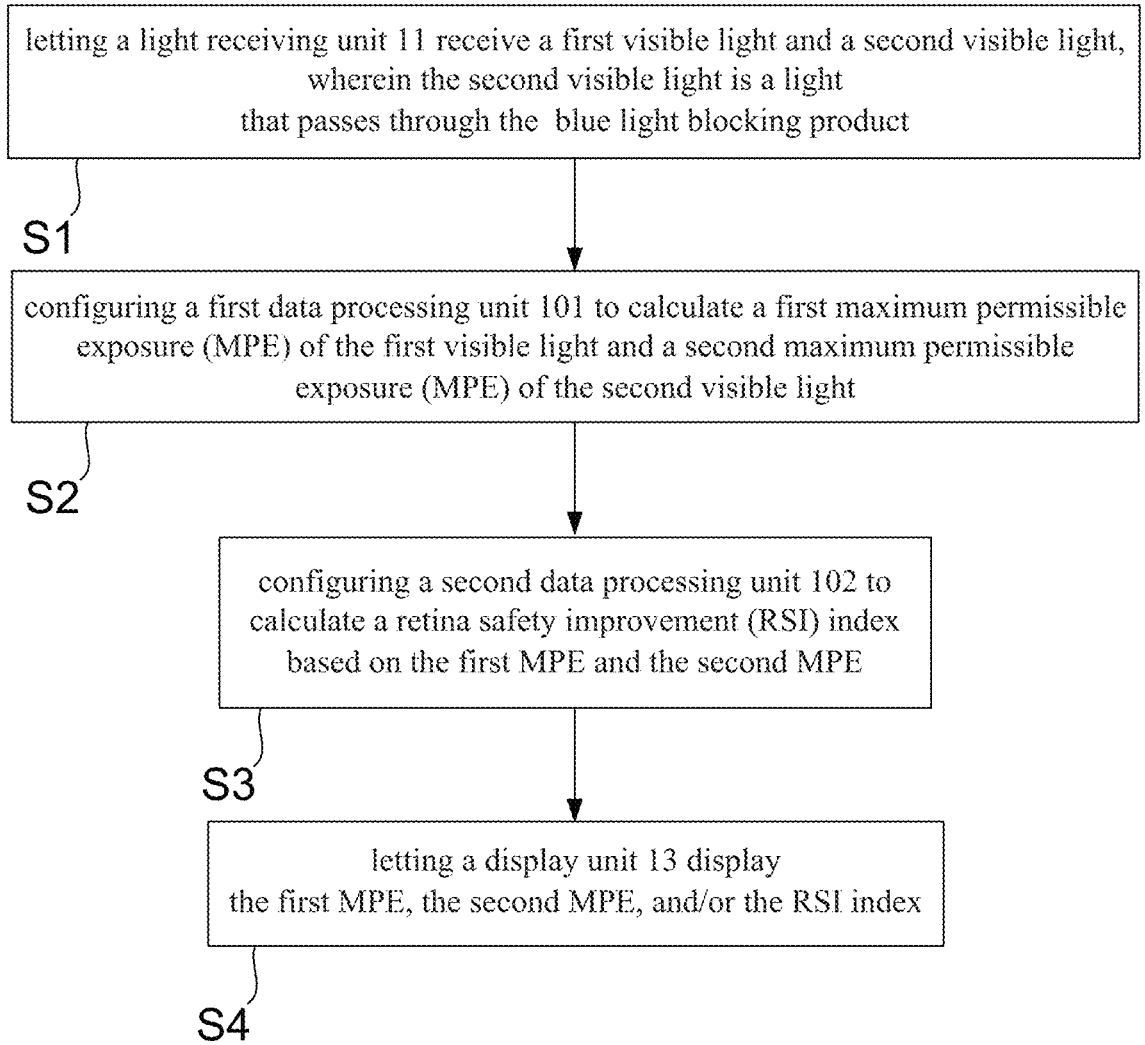
FIG. 12 shows a flowchart diagram of a method for measuring retina safety improvement index (RSI) according to the present invention.

FIG. 12 shows a flowchart diagram of a method for measuring retina safety improvement index (RSI) according to the present invention. As FIG. 6 and FIG. 12 show, the method flow is firstly proceeded to step S1: letting a light receiving unit 11 receive a first visible light and a second visible light, wherein the second visible light is a light that passes through the blue light blocking product. Subsequently, in step S2, it is configured a first data processing unit 101 to calculate a first maximum permissible exposure (MPE) of the first visible light and a second maximum permissible exposure (MPE) of the second visible light. After the first MPE and the second MPE are obtained, the method flow is next proceeded to step S3 for configuring a second data processing unit 102 to calculate a retina safety improvement (RSI) index based on the first MPE and the second MPE. Consequently, step S4 is executed for letting a display unit 13 display the first MPE, the second MPE, and/or the RSI index.

Therefore, through above descriptions, all embodiments and their constituting elements of the device and for measuring retina safety improvement index (RSI) proposed by the present invention have been introduced completely and clearly; in summary, the present invention includes the advantages of:

(1) The present invention discloses a device 1 for measuring retina safety improvement index (RSI), mainly comprising: a light receiving unit 11, a first data processing unit 101 and a second data processing unit 102. The light receiving unit 11 is used for receiving a first visible light and a second visible light that is obtained by letting the first visible light pass through a blue light blocking product. On the other hand, the first data processing unit 101 is configured for calculating a first maximum permissible exposure (MPE) of the first visible light and a second MPE of the second visible light, such that the second data processing unit 102 is able to eventually calculate a retina safety improvement (RSI) index based on the first MPE and the second MPE.

(1) As such, by using this novel device 1, a consumer is facilitated to know how much eyes-protecting ability does a specific blue light blocking (filtering) product have, without needing to read any numeric value of blue light filtering percentage and/or unfamiliar spectrogram.

The above description is made on embodiments of the present invention. However, the embodiments are not intended to limit scope of the present invention, and all equivalent implementations or alterations within the spirit of the present invention still fall within the scope of the present invention.

What is claimed is:

1. A method for measuring a retina safety improvement index of a blue light filter, comprising the steps of:
   electrically connecting a light sensor to an electronic device comprising a processor and a memory;
   operating the electronic device so as to install an application program in the memory, wherein the application program comprises instructions of a first mathematical model defended as $E_B = \Sigma_{300}^{700} E_\lambda \cdot B(\lambda)$, a second mathematical model defended as $$MPE = \frac{100}{E_B}$$

and a third mathematical model defended as $$RSI = \frac{MPE_2}{MPE_1},$$

where $E_B$ is an index of blue light hazard, $B(\lambda)$ being a blue hazard spectral weighting function, $E_\lambda$ representing a light irradiance, and MPE being maximum permissible exposure;
   operating the electronic device to drive the light sensor to collect a first light and a second light wherein the first light is a specific light, and the specific light being converted to the second light after passing through the blue light filter;
   operating the electronic device to execute the application program, such that the processor is configured to estimate a first maximum permissible exposure ($MPE_1$) of the first light and a second maximum permissible exposure ($MPE_2$) of the second light, and the processor being further configured to estimate a retina safety improvement index (RSI) of the blue light filter.

2. The method of claim 1,
   wherein the electronic device further comprises:
   a display, being coupled to the processor, and being controlled by the processor so as to show the retina safety improvement index of the blue light filter; and a communication interface, being coupled to the processor, such that the processor communicates with an external electronic device through the communication interface.

* * * * *